Patented Oct. 15, 1935

2,017,811

UNITED STATES PATENT OFFICE 2,017,811

CHLOROETHYL CHLOROETHOXY-ETHYL ETHER

Henry L. Cox, South Charleston, W. Va., assignor to Carbide and Carbon Chemicals Corporation, a corporation of New York No Drawing. Application April 17, 1934, Serial No. 720,947

3 Claims. (Cl. 260—151)

This invention relates to chloroethyl chloroethoxy-ethyl ether and to a process for producing it.

This new compound is a high-boiling, water-insoluble liquid, boiling at about 118° C. at 10 mm. pressure, and at about 230° C. at atmospheric pressure. It has a specific gravity of 1.197 at 20° C.

The properties possessed by the new compound adapt it admirably for use in the production of lubricants. Particularly, it may be substituted for dichloroethyl ether and like solvents in lubricants for use in high-pressure lubrication, or wherever undue volatilization of the lower boiling dichloroethyl ether would effect a breaking of the film of lubricant. The new ether is also adapted for use in organic synthesis, and as a high-boiling, chlorinated solvent and extractant, being a good solvent for oils and for hydrocarbons.

The compound appears to have a structure corresponding to the formula:

and may also be identified as $\beta$-chloroethyl $\beta$-chloroethoxy-ethyl ether, or as triethylene glycol dichloride.

The new compound may be prepared by reacting ethylene chlorhydrin or ethylene oxide with chlorine and ethylene, preferably in the presence of water and at temperatures in the range from around atmospheric temperature, 20° C., to around 100° C. Water, chlorine and ethylene may be used as starting materials, in which case ethylene chlorhydrin is continuously formed from the water and a part of the chlorine and olefine.

In the practice of the invention according to one modification thereof, ethylene and chlorine are bubbled through a body of water in a closed chamber. The gases are introduced into the chamber in uniform manner by means of the usual diffusers. Ethylene oxide is also passed through the body of liquid at such a rate as to react with most of the free acid and thus maintain the liquid slightly acid. The water, chlorine, and ethylene react to form ethylene chlorhydrin and hydrochloric acid, and most of the latter reacts with the ethylene oxide to form additional ethylene chlorhydrin. The unexhausted gases may be recycled in the process in the interests of economy. The $\beta$-chloroethyl-$\beta$-chloroethoxy-ethyl ether and byproducts concurrently formed gradually accumulate in the liquid body. Water is added occasionally to prevent depletion of the chlorhydrin content of the liquid. When the accumulated products are present in sufficient amount (they often form nearly half of the liquid contents), all or a portion of the liquid may be treated with water. Upon standing, two layers form, the upper one of which may be returned for further treatment in the manner described above. The lower layer contains the new ether together with water and some chlorhydrin and other products. Washing the layer with water removes a part of the chlorhydrin. The remaining liquid is then subjected to fractional distillation, preferably under subatmospheric pressure, and the fraction distilling over at around 118° C. at 10 mm. pressure contains the $\beta$-chloroethyl $\beta$-chloroethoxy-ethyl ether. The final purification of the latter is accomplished by distillation under subatmospheric pressure.

The reactions which probably occur in the production of the new ether are indicated in the following equations. It will be understood, however, that the invention is not in any sense to be considered as limited by any statement of theory appearing herein.

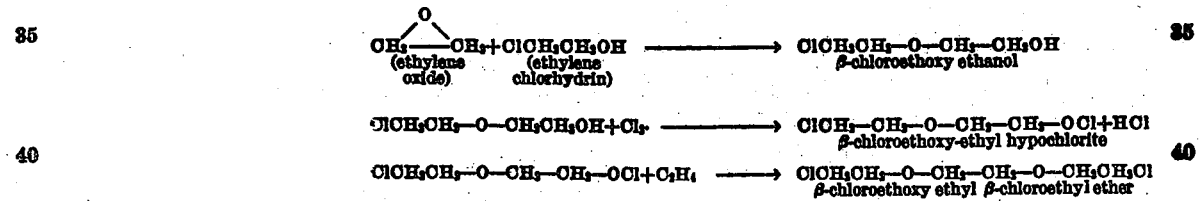

The $\beta$-chloroethyl $\beta$-chloroethoxy-ethyl ether may be recovered from the resultant reaction mixture by fractional distillation, preferably under subatmospheric pressure, either with or without a prior separation therefrom of an aqueous layer containing the chloroethanols for reuse in the process.

The invention is susceptible of modification within the scope of the appended claims.

I claim:

1. As a chemical compound, $\beta$-chloroethyl-$\beta$-chloroethoxy-ethyl ether, the same being a liquid insoluble in water, and boiling at about 118° C. at 10 mm. absolute pressure, and at about 230° C. at atmospheric pressure.

2. As a chemical compound, β-chloroethyl-β-chloroethoxy-ethyl ether, the same being a liquid insoluble in water, and having a specific gravity at 20° C. of 1.197, and boiling at about 230° C. under atmospheric pressure, and apparently having the structure designated by the formula $$ClCH_2CH_2—O—CH_2CH_2—O—CH_2CH_2Cl.$$

3. As a new chemical compound, triethylene glycol dichloride, the same being a water-insoluble high-boiling solvent for oils and hydrocarbons, and boiling at about 118° C. under 10 mm. of mercury absolute pressure.

HENRY L. COX.